(12) United States Patent
Lin (10) Patent No.: US 6,696,152 B1
(45) Date of Patent: Feb. 24, 2004

(54) POLYPROPYLENE WICKER FOR WEAVING A BAG

(76) Inventor: Mao-Gi Lin, 123, Bei Si Li Rd., Hu Wei Town, Yun Lin Hsuan (TW)

( * ) Notice: Subject to any disclaimer, the term of this patent is extended or adjusted under 35 U.S.C. 154(b) by 0 days.

(21) Appl. No.: 10/391,076

(22) Filed: Mar. 17, 2003

(51) Int. Cl.[7] .......................... D01F 6/00; D03D 15/00; B29C 47/06; B65D 30/08
(52) U.S. Cl. ................. 428/364; 428/121; 383/67; 383/107; 383/109; 264/414; 139/97
(58) Field of Search .................. 428/364, 121; 383/67, 107, 109; 264/414; 139/97

(56) References Cited

U.S. PATENT DOCUMENTS 5,615,713 A * 4/1997 Benesi .................. 139/97
6,368,543 B1 * 4/2002 Lin ...................... 264/414

* cited by examiner

Primary Examiner—N. Edwards
(74) Attorney, Agent, or Firm—Alan D. Kamrath (57) ABSTRACT

A plurality of polypropylene wickers are made of a polypropylene film. The polypropylene film passes through a chill roller to decrease a temperature of the polypropylene film, and a cutting roller having a plurality of cutting blades to cut the polypropylene film into a plurality of polypropylene bands. Each of the polypropylene bands passes through a U-shaped mold roller set and a folding mold, the folding mold folding the corresponding polypropylene band into three layers, a folding roller folding the corresponding polypropylene band completely to form a polypropylene woven yarn, and the polypropylene woven yarn passing through an extension molding roller set and a setting roller set.

4 Claims, 8 Drawing Sheets

POLYPROPYLENE WICKER FOR WEAVING A BAG

BACKGROUND OF THE INVENTION

The present invention relates to a polypropylene wicker. More particularly, the present invention relates to a plurality of polypropylene wicker which is used for weaving a bag.

A conventional polypropylene wicker which is used for weaving a bag has a single layer. When the bag contains a plurality of heavy articles, the bag is easily broken.

SUMMARY OF THE INVENTION

An object of the present invention is to provide a polypropylene wicker which has at least three folding layers to reinforce a bag made of a plurality of polypropylene wickers.

Accordingly, a polypropylene wicker comprises a polypropylene woven yarn having at least three folding layers.

In accordance with a preferred embodiment of the present invention, a method of preparing a plurality of polypropylene wickers comprises a polypropylene film passing through a chill roller to decrease a temperature of the polypropylene film, and a cutting roller having a plurality of cutting blades to cut the polypropylene film into a plurality of polypropylene bands. Each of the polypropylene bands passes through a U-shaped mold roller set and a folding mold, the folding mold folding the corresponding polypropylene band into three layers, a folding roller folding the corresponding polypropylene band completely to form a polypropylene woven yarn, and the polypropylene woven yarn passing through an extension molding roller set and a setting roller set.

DETAILED DESCRIPTION OF THE INVENTION

Referring to FIGS. 1 to 8, a polypropylene (PP) wicker comprises a polypropylene woven yarn 3 having at least three folding layers.

Figure 1:
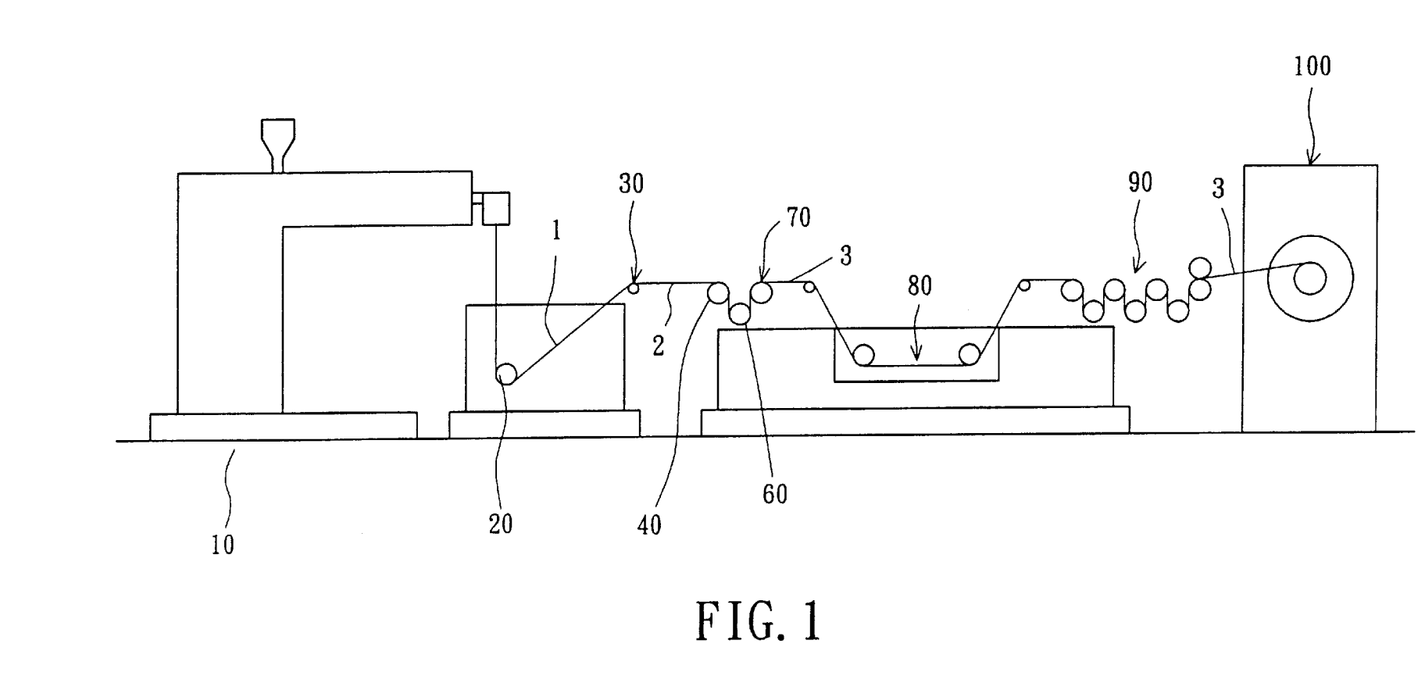
FIG. 1 is a schematic view illustrating a process of preparing a polypropylene wicker of a preferred embodiment in accordance with the present invention.
Figures 2, 2A:
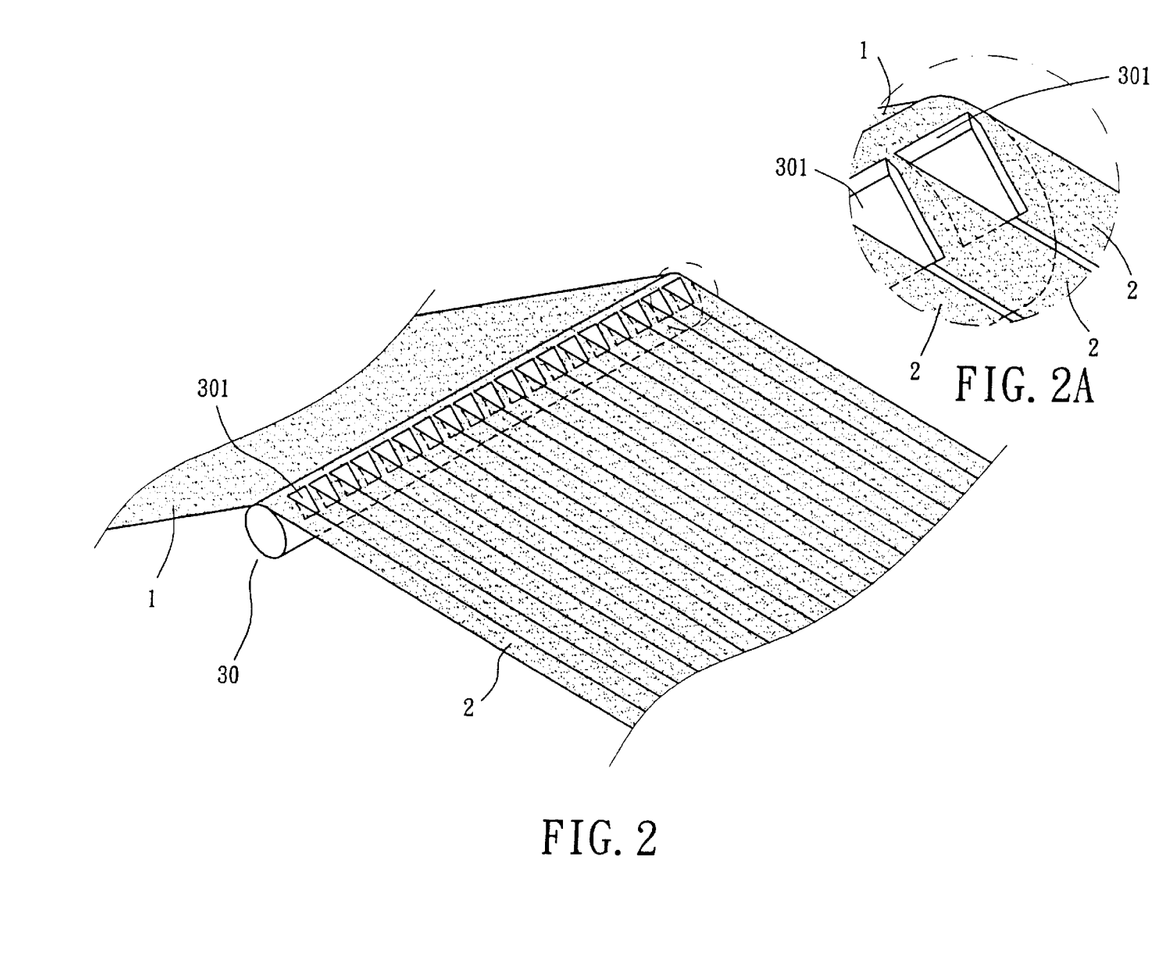
FIG. 2 is a schematic view illustrating a polypropylene film is cut by a plurality of cutting blades of a cutting roller of a preferred embodiment in accordance with the present invention.
FIG. 2A is a partially enlarged view of FIG. 2.

Referring to FIGS. 1 to 5, a method of preparing a plurality of polypropylene wickers comprises an extruder extruding a polypropylene film 1, the polypropylene film 1 passing through a chill roller 20 to decrease a temperature of the polypropylene film 1, and a cutting roller 30 having a plurality of cutting blades 301 to cut the polypropylene film 1 into a plurality of polypropylene bands 2 (as shown in FIG. 2). Each of the polypropylene bands 2 passes through a U-shaped mold roller set 40 and a folding mold 60, the folding mold 60 folding the corresponding polypropylene band 2 into three layers, a folding roller 70 folding the corresponding polypropylene band 2 completely to form a polypropylene woven yarn 3, the polypropylene woven yarn 3 passing through an extension molding roller set 80 and a setting roller set 90.

A winding machine 100 winds the polypropylene woven yarn 3.

Figure 3:
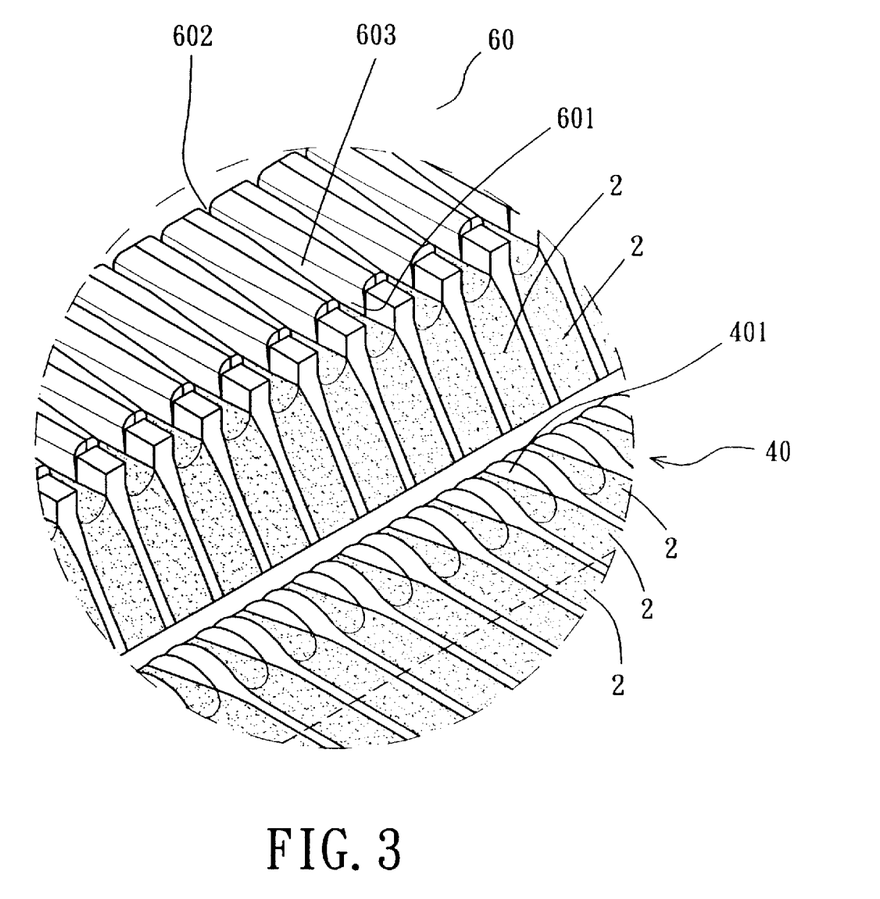
FIG. 3 is a schematic view illustrating a plurality of polypropylene bands passing through a U-shaped mold roller set and a plurality of folding molds of a preferred embodiment in accordance with the present invention.
Figure 4:
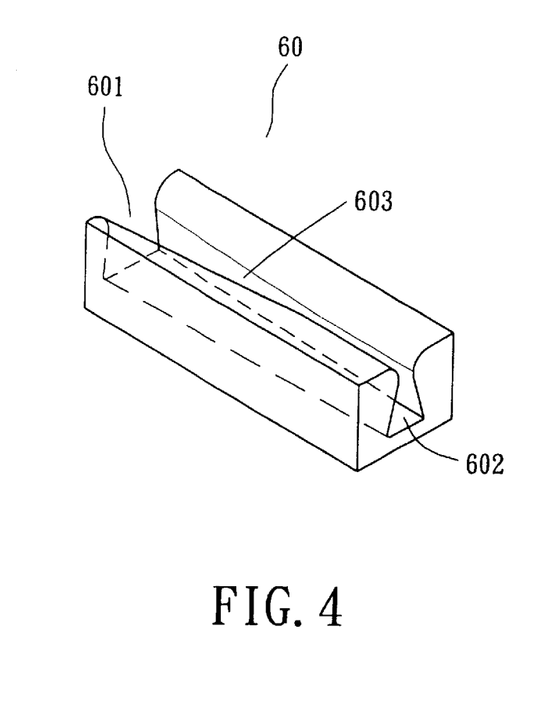
FIG. 4 is a perspective view of a folding mold of a preferred embodiment in accordance with the present invention.
Figure 4A:
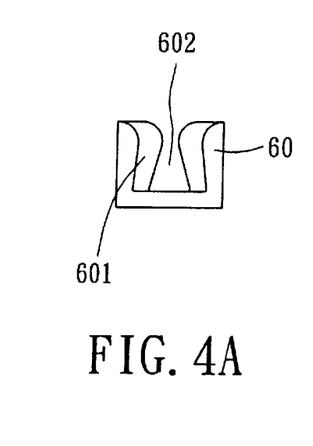
FIG. 4A is a front elevational view of a folding mold of a preferred embodiment in accordance with the present invention.
Figure 4B:
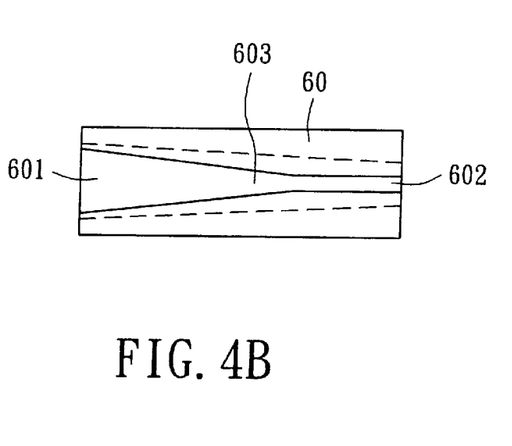
FIG. 4B is a top plan view of a folding mold of a preferred embodiment in accordance with the present invention.
Figure 5:
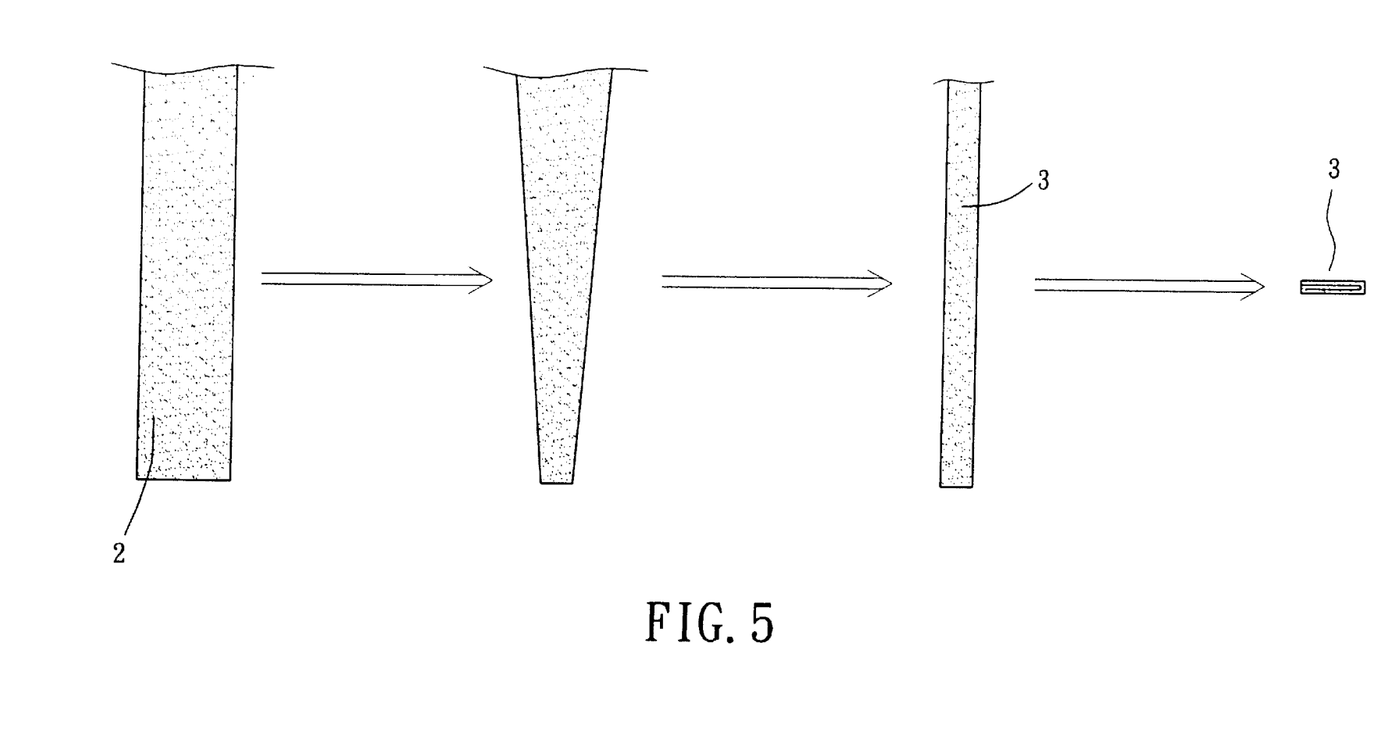
FIG. 5 is a flow diagram illustrating a formation of three folding layers of a polypropylene woven yarn of a preferred embodiment in accordance with the present invention.
Figure 6:
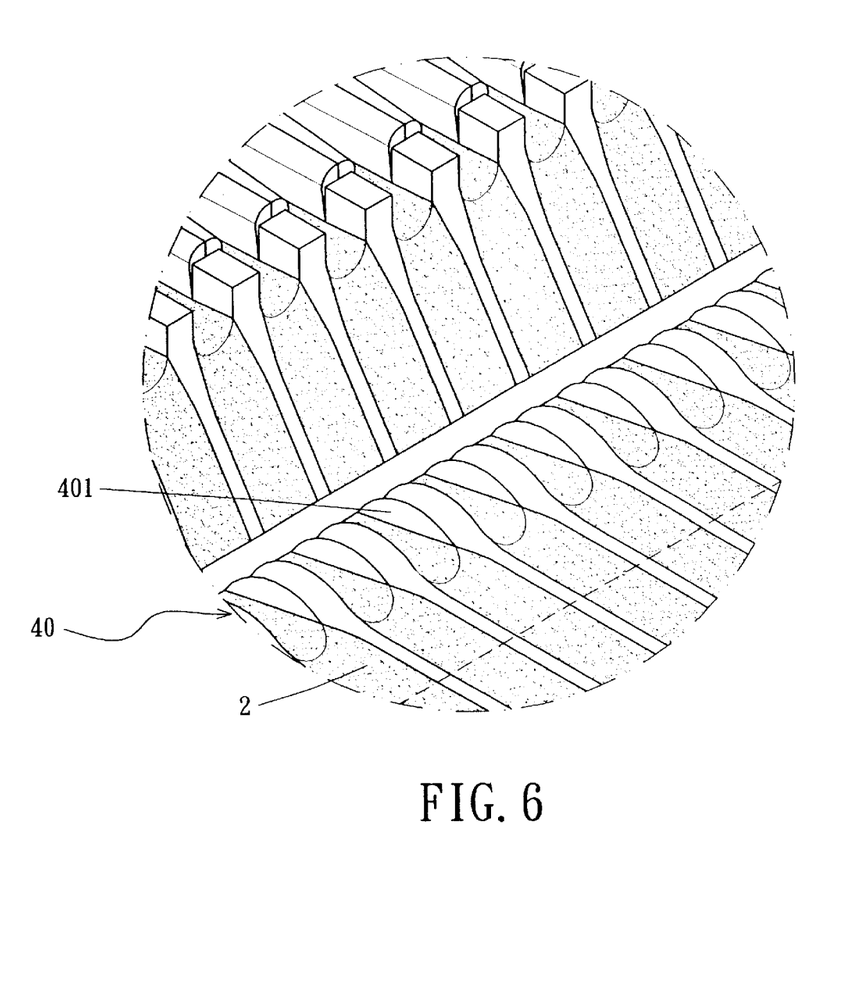
FIG. 6 is a schematic view illustrating a U-shaped mold roller set separating a polypropylene film into a plurality of polypropylene bands.
Figure 7:
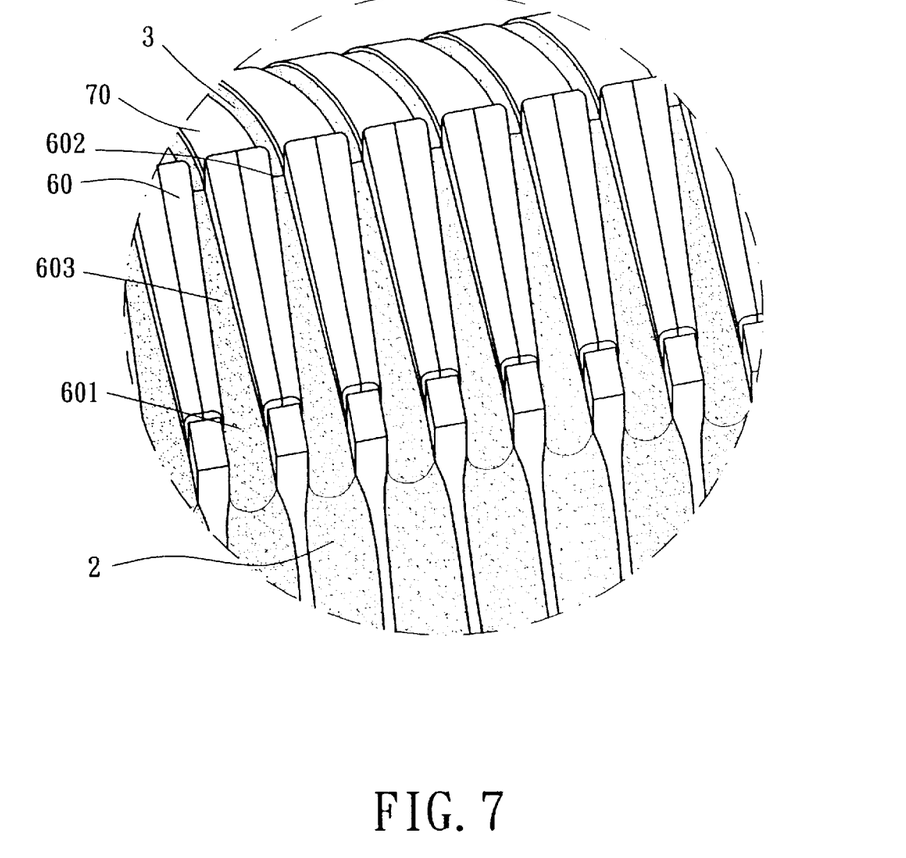
FIG. 7 is a schematic view illustrating a plurality of folding molds folding a plurality of polypropylene bands.
Figure 8:
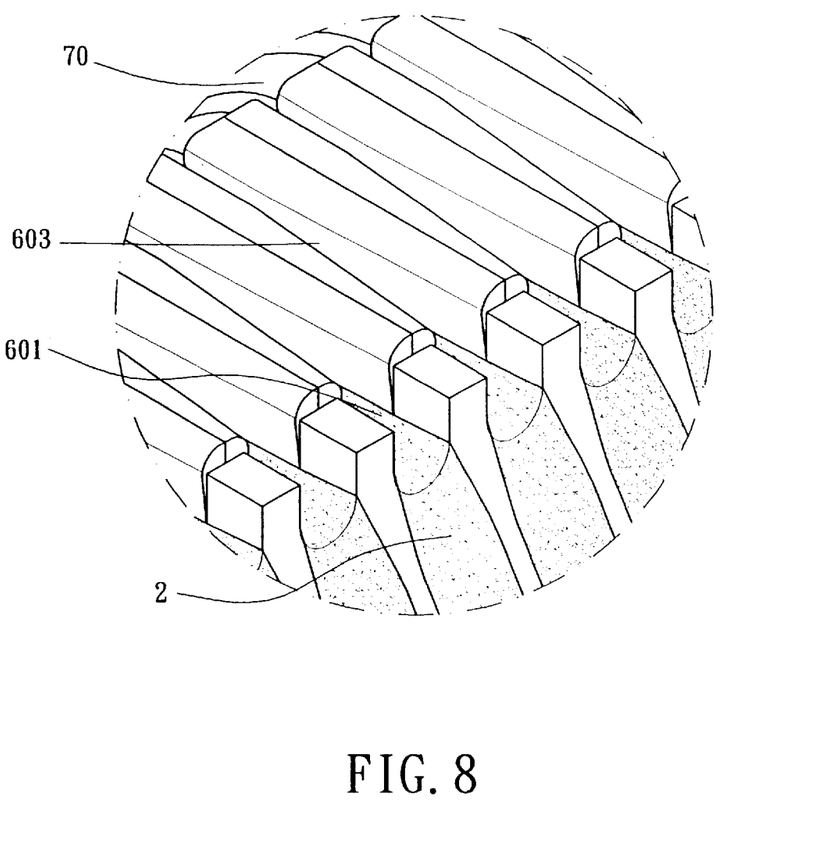
FIG. 8 is another schematic view illustrating a plurality of folding molds folding a plurality of polypropylene bands.

Referring to FIGS. 3 and 6, the U-shaped mold roller set 40 has a plurality of grooves 401 to receive the polypropylene bands 2.

Referring to FIGS. 3, 4, 4A, 4B, 5, 7 and 8, the folding mold 60 has an inlet 601, an outlet 602, a U-shaped channel 603 communicating with the inlet 601 and the outlet 602, and the U-shaped channel 603 receiving the corresponding polypropylene band 2. A width of the outlet 602 is approximately one-third of a width of the inlet 601. The polypropylene band 2 will have three layers while passes through the outlet 602. The folding roller 70 presses the polypropylene band 2 completely to form a polypropylene woven yarn 3. The polypropylene woven yarn 3 is extended by the extension molding roller set 80 and set by the setting roller set 90.

The invention is not limited to the above embodiment but various modification thereof may be made. Further, various changes in form and detail may be made without departing from the scope of the invention.

I claim:

1. A polypropylene wicker comprises:
   a polypropylene woven yarn having at least three folding layers.

2. A method of preparing a plurality of polypropylene wickers comprises:
   a polypropylene film passing through a chill roller to decrease a temperature of the polypropylene film, and a cutting roller having a plurality of cutting blades to cut the polypropylene film into a plurality of polypropylene bands,
   each of the polypropylene bands passing through a U-shaped mold roller set and a folding mold, the folding mold folding the corresponding polypropylene band into three layers, a folding roller folding the corresponding polypropylene band completely to form a polypropylene woven yarn, and
   the polypropylene woven yarn passing through an extension molding roller set and a setting roller set.

3. A method of preparing a plurality of polypropylene wickers as claimed in claim 2, wherein the U-shaped mold roller set has a plurality of grooves to receive the polypropylene bands.

4. A method of preparing a plurality of polypropylene wickers as claimed in claim 2, wherein the folding mold has an inlet, an outlet, a U-shaped channel communicating with the inlet and the outlet, the U-shaped channel receiving the corresponding polypropylene band, and a width of the outlet is approximately one-third of a width of the inlet.

* * * * *